United States Patent [19]

Tanaka

[11] Patent Number: 5,799,294
[45] Date of Patent: Aug. 25, 1998

[54] METHOD FOR FINDING CAUSE OF ABNORMAL EVENT IN SUPPORT OF PLANT OPERATION

[75] Inventor: Satoshi Tanaka, Takasago, Japan

[73] Assignee: Mitsubishi Jukogyo Kabushiki Kaisha, Tokyo, Japan

[21] Appl. No.: 606,088

[22] Filed: Feb. 23, 1996

[30] Foreign Application Priority Data

Feb. 28, 1995 [JP] Japan ................................. 7-040475

[51] Int. Cl.$^6$ .................................................. G06F 17/00
[52] U.S. Cl. .......................... 706/46; 706/45; 706/50; 706/52; 706/55
[58] Field of Search ....................... 395/51, 52, 54, 395/60, 63, 61

[56] References Cited

U.S. PATENT DOCUMENTS

| | | | |
|---|---|---|---|
| 5,127,005 | 6/1992 | Oda et al. | 395/183.02 |
| 5,305,426 | 4/1994 | Ushioda et al. | 395/61 |
| 5,369,756 | 11/1994 | Imura et al. | 395/183.02 |

FOREIGN PATENT DOCUMENTS 59-231609  6/1983  Japan.

OTHER PUBLICATIONS

Rai, Suresh. "A Direct Approach to Obtain Tighter Bounds for Large Fault Trees with Repeated Events," Jan. 1994 Proceedings Annual Reliability and Maintainability Symposium, pp. 475–480.

*Primary Examiner*—Allen R. MacDonald
*Assistant Examiner*—Jason W. Rhodes
*Attorney, Agent, or Firm*—Bell Seltzer Intellectual Property Law Group of Alston & Bird LLP

[57] ABSTRACT

The accuracy of finding a cause from factors cited by means of a MYCIN method by narrowing down such factors is improved. With respect to deriving events which would not possibly occur if a particular factor 10C among a plurality of factors is a cause of abnormal event 100C, negative deriving events 12C and 1MC negating these deriving events of the other factors which would not occur with factor 10C being the cause are added to a fault tree chart as deriving events of factor 10C.

8 Claims, 6 Drawing Sheets

METHOD FOR FINDING CAUSE OF ABNORMAL EVENT IN SUPPORT OF PLANT OPERATION

BACKGROUND OF THE INVENTION

1. Field of the Invention

The present invention relates to a method for investigating causes of abnormal events in support of plant operations, which method is used in a plant operation supporting device, wherein an investigation of a cause of an abnormal event in the plant operation supporting device is performed using a relationship between the abnormal event and a plurality of factors causing this abnormal event, a fault tree chart showing relationships among the factors and events deriving them, and event evaluation values indicating a frequency or possibility of occurrence of the deriving event.

2. Description of the Related Art

Figure 3:
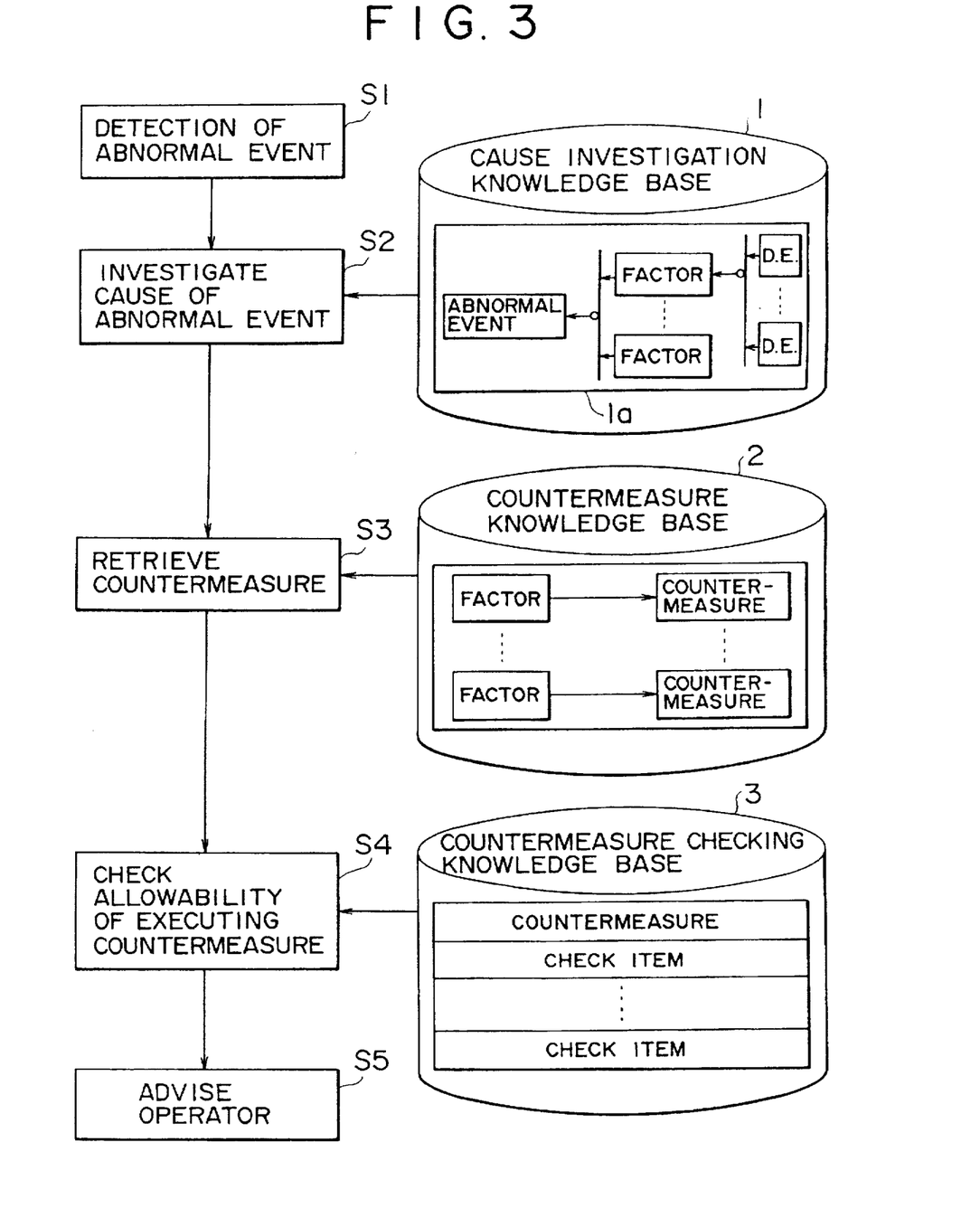
FIG. 3 is a flow chart showing a diagnosing process in a plant operation supporting device.

FIG. 3 is a flow chart showing a diagnostic process in the plant operation supporting device.

First, if an abnormal event is detected in step S1, then in step S2 a cause of the abnormal event is investigated. During this investigation, use is made of relationships between abnormal events stored in a cause investigation knowledge base 1, and a fault tree chart (hereinafter called FT chart) 1a showing relationships among possible factors causing these abnormal events, deriving events, and factors for the deriving events. Then in step S3, a countermeasure is searched in order to solve the cause found in step S2. At this time, countermeasures which may be considered as candidates for dealing with each factor are searched in a countermeasure-search knowledge base 2. In step S4, it is checked if any problem would occur when an operator executes the countermeasures searched in step S3. For this, use is made of items to be checked regarding the countermeasures obtained from a countermeasure-checking knowledge base 3. Then in step S5, the operator is advised of the determined cause and the countermeasures to be taken.

Figure 4:
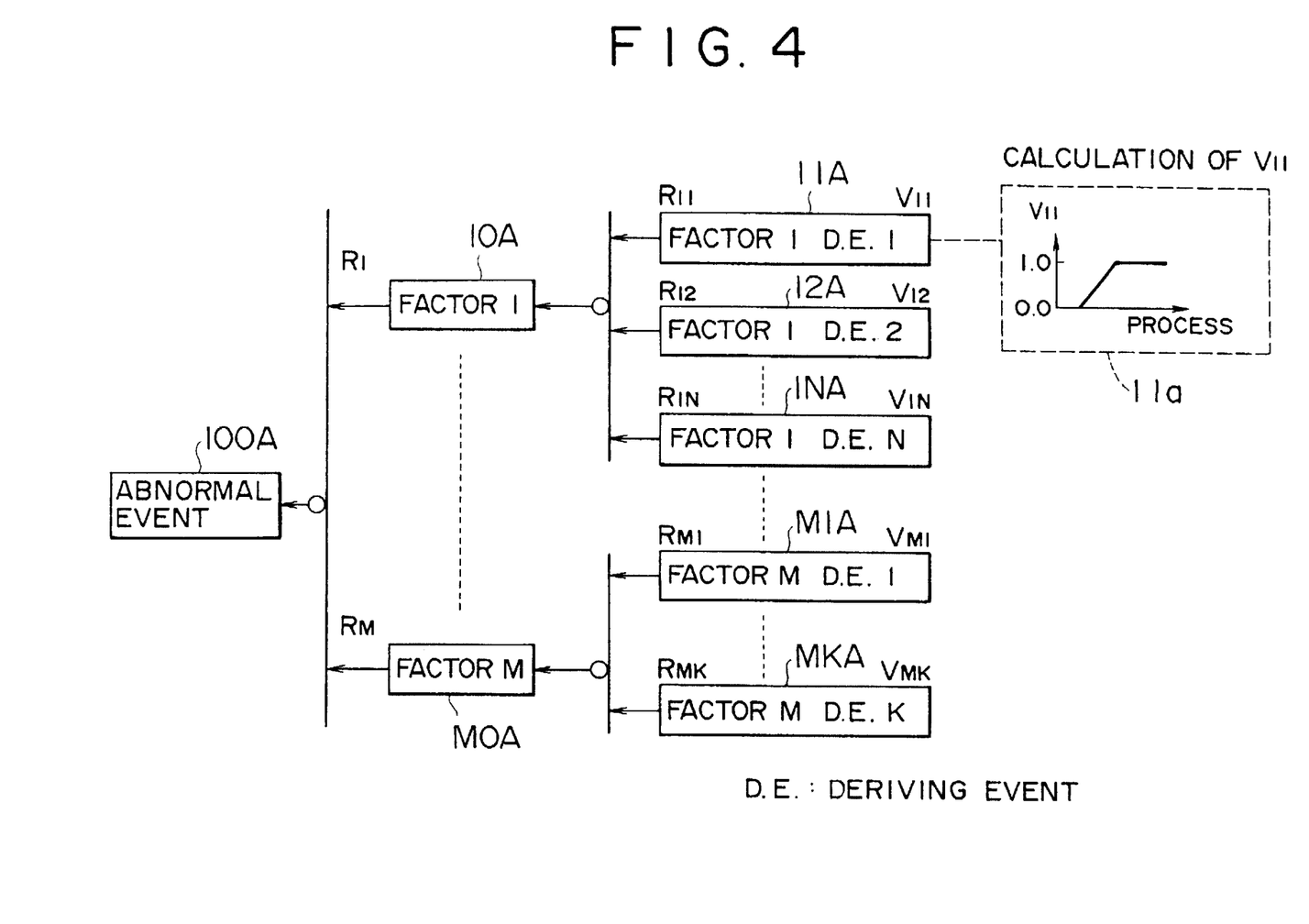
FIG. 4 is a chart explaining the method for finding a cause of an abnormal event using a MYCIN method.

Conventionally, diagnosis has been performed mainly using a MYCIN method in the investigation of the cause of the abnormal event in step S2. This MYCIN is the name of a product operated in a computer for dealing with medical diagnosis developed by Shortliffe at Stanford University in 1976, and recently this is employed not only in medical diagnosis, but also in a wide range of fields such as investigation of causes for abnormal events occurring in plants. FIG. 4 is a drawing explaining this MYCIN technique. According to the MYCIN technique, common abnormal events may be illustrated by an FT chart in FIG. 4.

In FIG. 4, factors 10A to M0A possibly cause an abnormal event 100A. Deriving events 11A to 1NA derive factor 10A, and deriving events M1A to MKA derive factor M0A.

Symbols R attached to factors 10A to M0A are empirically obtained weight coefficients having values of 0 to 1. $R_i$ indicates a strength of a relationship between abnormal event 100A and each of factors 10A to M0A. If the corresponding abnormal event 100A always occurs when the relevant factor occurs, $R_i$ takes a larger value. $R_{ij}$ indicates strengths of relationships between factors 10A to M0A and deriving events 11A to MKA. If the corresponding deriving event always occurs when the relevant factor occurs, $R_{ij}$ takes a larger value.

V is an event evaluation value indicating the frequency or possibility of occurrence of a deriving event. $V_{11}$ to $V_{MK}$ are, as illustrated in 11a, calculated using a threshold function.

According to the MYCIN method, when an abnormal event occurs, certainty values CF of factors possibly causing

2 this abnormal event are obtained by means of equation (2) described below, and the factor having the largest certainty value CF is diagnosed as a cause of the currently occurring abnormal event.

$$CF_i = R_i(1-R_{i1}V_{i1})(1-R_{i2}V_{i2}) \ldots (1-R_{ij}V_{ij}) \quad (2)$$

As described above, conventionally, the MYCIN method has been utilized in the plant operation supporting device for investigating causes of abnormal events. In ordinary plants, however, when a-factor causing such an abnormal event occurs, deriving events similar to it deriving other factors often occur. Therefore, the MYCIN method only allows indication of probable factors causing the current abnormal event, and it has not been possible to identify a true cause among those probable factors.

Figure 5:
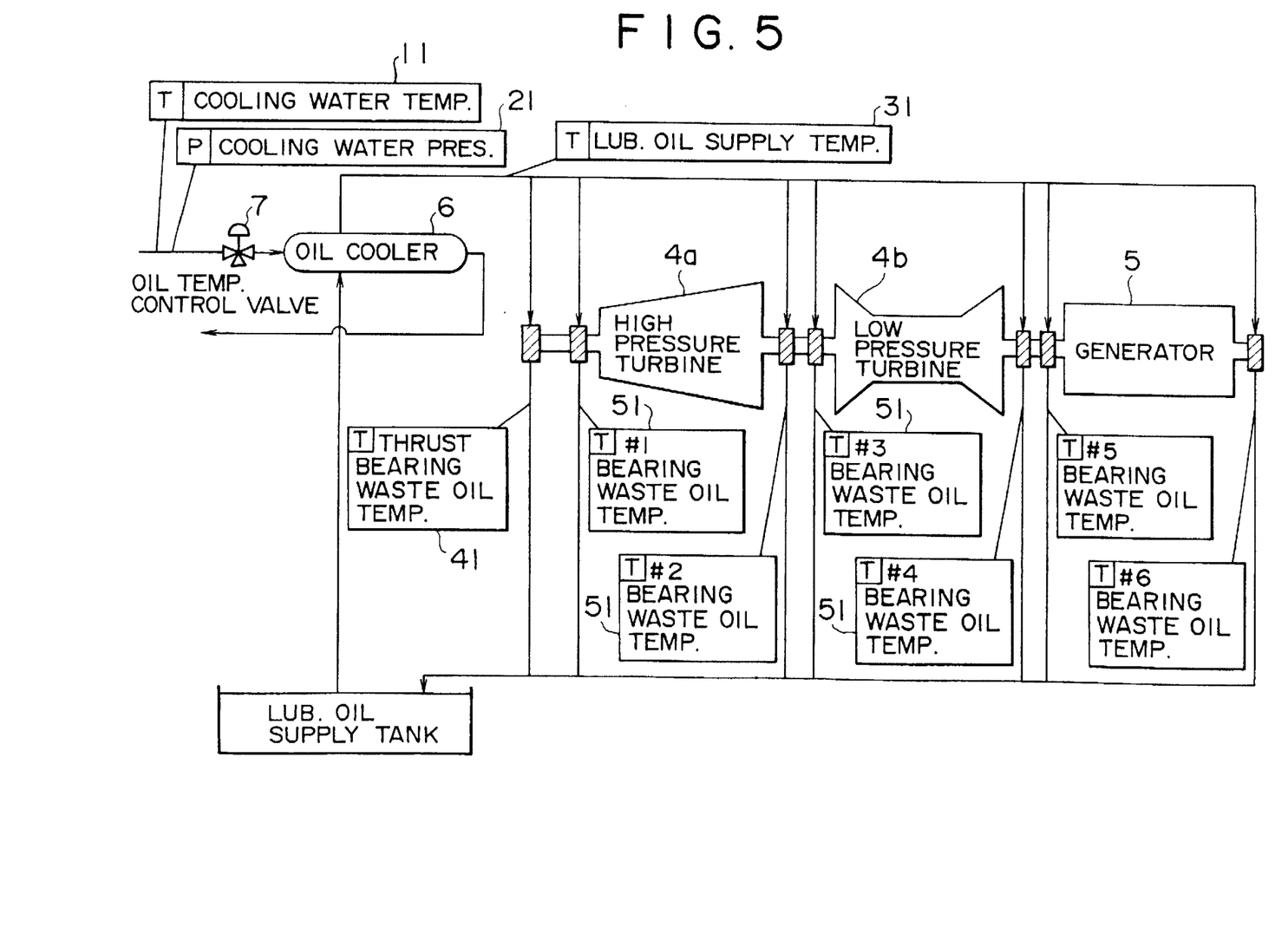
FIG. 5 is a conceptual drawing for a steam turbine lubricating oil system.
Figure 6:
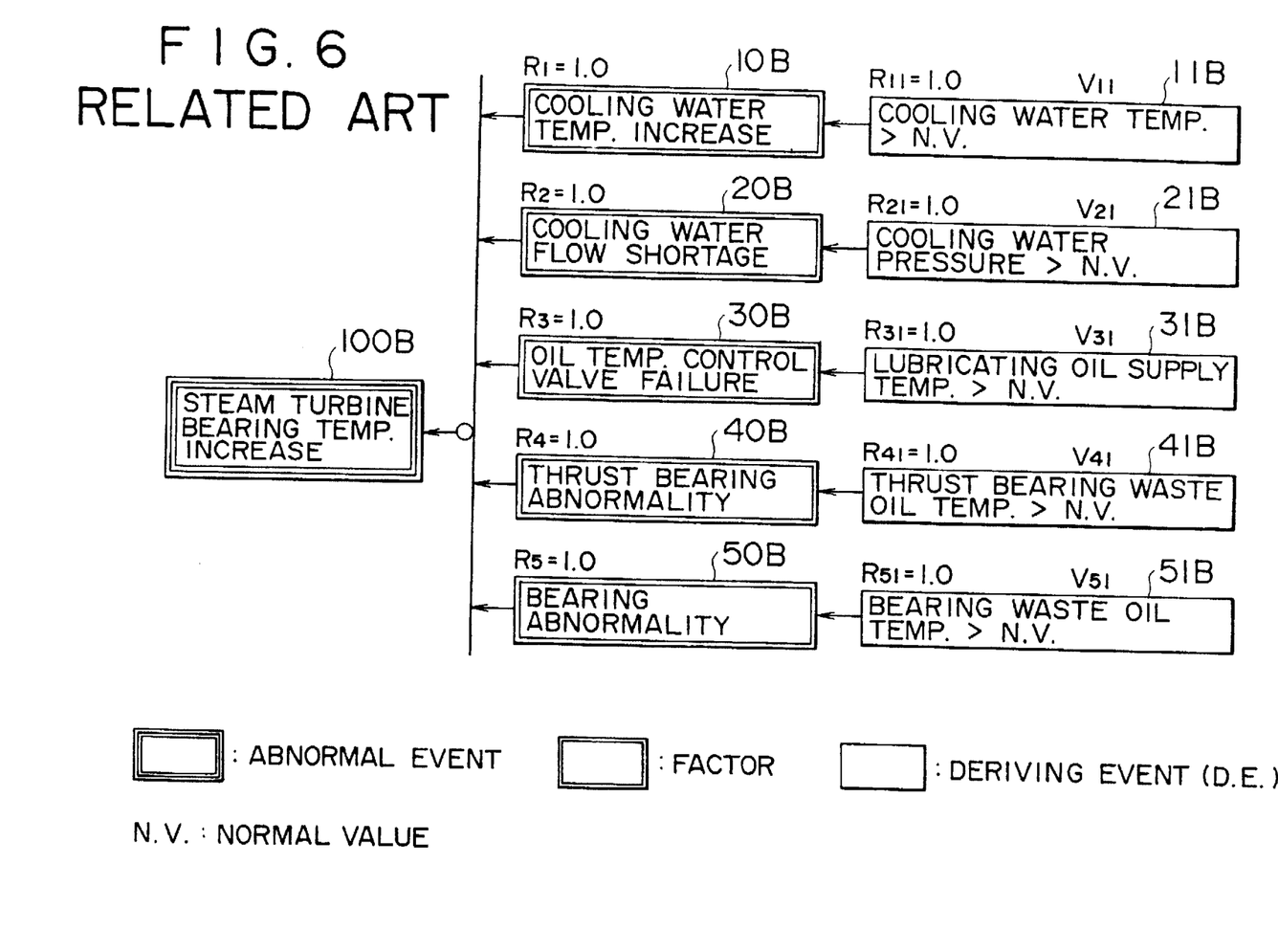
FIG. 6 shows a conventional FT chart of steam turbine bearing temperature increase.

FIG. 5 is a view showing a lubricating oil system of a steam turbine for the purpose of illustrating the above-described problem more in detail. In the drawing, 4a is a high-pressure turbine, 4b is a low-pressure turbine, 5 is a generator connected to these, 6 is an oil cooler, 7 is an oil temperature control valve, 11 is a cooling water temperature, 21 is a cooling water pressure, 31 is a lubricating oil supplying temperature, 41 is a thrust bearing waste oil temperature, and 51 is a waste oil temperature of each bearing. This is a system in which when an abnormal event called "increase in steam turbine bearing temperature" occurs due to an increase in the cooling water temperature, the temperatures of the lubricating oil, thrust bearing waste oil and bearing waste oil will also increase correspondingly. In this case, as shown in an FT chart of "increase in steam turbine bearing temperature" in FIG. 6, when diagnosis is performed using the MYCIN method, weight coefficients $R_1$ to $R_5$ of factors 10B to 50B are all 1.0 with respect to an abnormal event 10B "increase in a steam turbine bearing temperature", weight coefficients of deriving events 11B to 51B are also all 1.0 and event evaluation values $V_{11}$ to $V_{51}$ are shown as in the case of a later described table. As a result, not only the "increase in the cooling water temperature", but also such other factors as "oil temperature control valve failure", "thrust bearing abnormal event", "bearing abnormal event", and the like are cited as possible factors causing the current abnormal event, and it is impossible to further narrow the factors and find a true cause by means of the MYCIN method.

Therefore, with the conventional plant operation supporting device using the MYCIN method, it has been very difficult for the operator to determine which countermeasure is relevant because all the countermeasures to deal with the indicated factors are displayed, and it has not been possible for the operator to take a countermeasure by referring to such output immediately after an abnormal event occurs. That is, it has been a far cry from an ideal state of the plant operation supporting device in which even an unskilled operator can operate the plant just as well as a highly skilled operator can do.

SUMMARY OF THE INVENTION

It is an object of the invention to provide a method for finding a cause of an abnormal event in support of plant operations, wherein accuracy of finding the cause from the factors indicated according to the MYCIN method can be improved by narrowing down the factors using a new method in which AND diagnosis is proposed, while the MYCIN method allows only OR diagnosis.

A first aspect of the present invention provides a method for finding a cause of an abnormal event in support of plant operations in which the investigation of a cause of an abnormal event is performed in the plant operation supporting device, using a relationship between the abnormal event and a plurality of possible factors causing this particular abnormal event, a fault tree chart showing relationships among such factors and deriving events thereof, and event evaluation values indicating frequencies of occurrence of the deriving events, wherein a deriving event in the negative form negating deriving events which would not possibly occur if one of the factors is the cause of the abnormal event and which derives another factor different from said one of the factors is added to the fault tree chart as a deriving event of said one of the factors.

A second aspect of the invention provides a method for finding a cause of an abnormal event in support of plant operations according to the above first aspect, as an event evaluation value for each of the deriving events is provided as $V_{ij}$, a certainty $CF_i$ of each factor is calculated using equation (1), and a factor having the largest value among the calculated values of certainties $CF_i$ is adopted as the cause of the abnormal event.

According to the first aspect of the invention, in the method for finding a cause of an abnormal event in support of plant operations, with respect to events which would not possibly occur if one of a plurality of factors is a cause of the abnormal event and which derives other factors, a negative deriving event negating such deriving events of another factor different from said one of the factors is added to the fault tree chart as a deriving event of said one of the factors. Therefore, the amount of information concerning each factor to be used for investigating the cause of abnormal events increases, and the accuracy of finding the cause thereof improves.

According to the second aspect of the invention, in the method for finding a cause of an abnormal event in support of plant operations, if an event evaluation value $V_{ij}$ is given respectively for a case in which each deriving event occurs and for a case in which each deriving event does not occur, by means of equation (1), a factor having a largest certainty value $CF_i$ is determined with higher credibility to be the cause of the abnormal event.

DETAILED DESCRIPTION OF THE PREFERRED EMBODIMENT

EXAMPLE 1

Explanation will now be made of the examples of the invention referring to the accompanying drawings.

Figure 1:
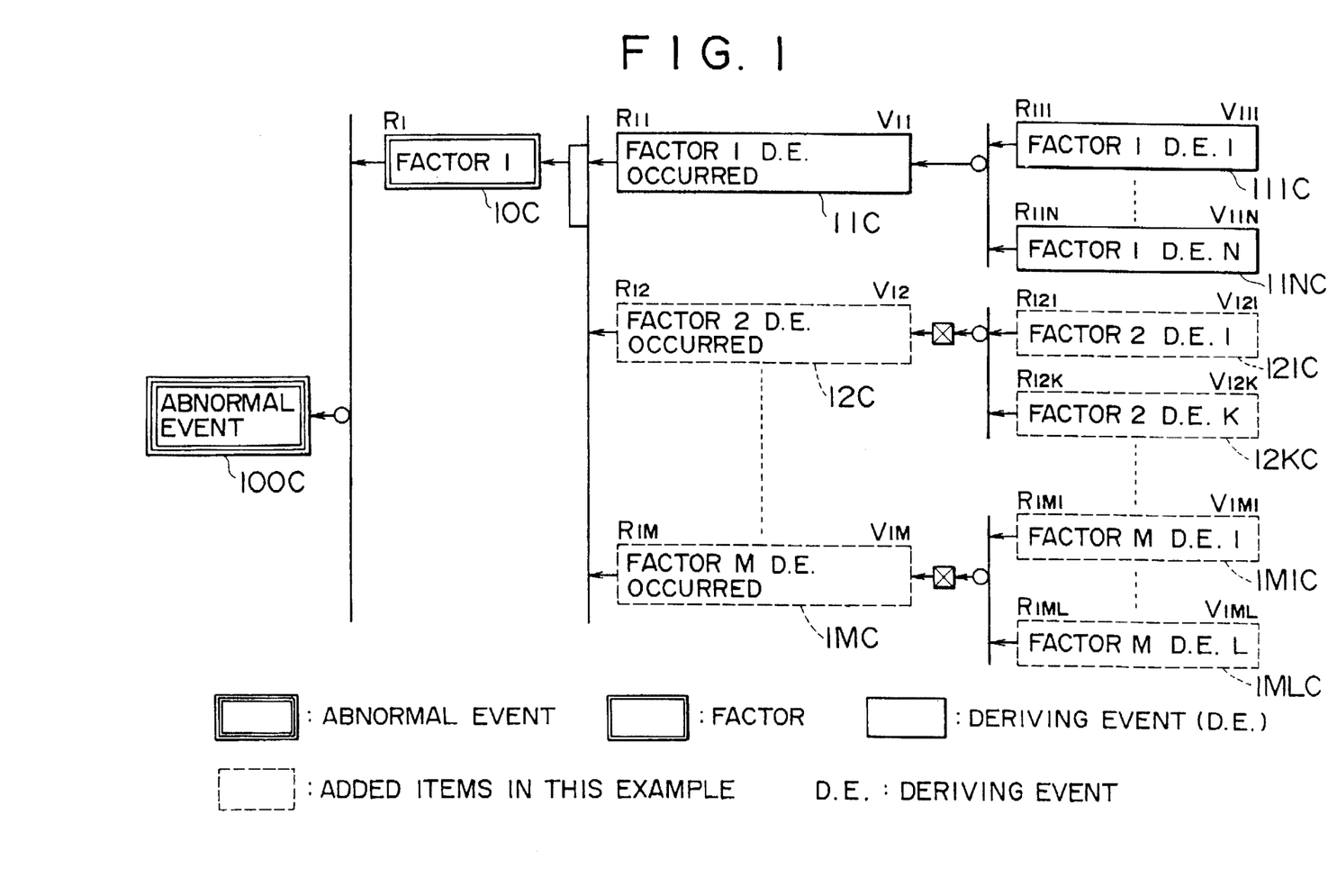
FIG. 1 is a chart explaining the method for finding a cause of an abnormal event according to the present invention.

FIG. 1 is a conceptual view of an example of the invention, in which with respect to each factor (only 10C is shown in the drawing), negative deriving events 12C to 1MC negating events which would not possibly occur if this factor 10C is a cause of the current abnormal event and which derive another factor are, as described later, obtained from 121C to 1MLC, and these are added to the FT chart shown in FIG. 4 as deriving events of factor 10C.

According to the invention, certainties or credibilities of factors cited as possible causes by means of the conventional MYCIN method are calculated using an equation described below, and a factor having the highest certainty is determined to be a cause of the current abnormal event. That is, existence of deriving events which would never occur if this factor is the cause of the abnormal event is checked, and when these have occurred, the certainty of this factor is automatically made low. By repeating this process, a factor whose certainty remains highest at the end is determined to be the cause of the current abnormal event.

An event evaluation value of a given factor 10C (indicating occurrence or non-occurrence of deriving events of this factor) $V_{i1}$ is calculated using equation (2) below. This is the same as in the case of the conventional MYCIN method. In the equation, $V_{i11}$ to $V_{i1N}$ are event evaluation values for deriving events 111C to 11NC of the factor 10C, and $R_{i11}$ to $R_{i1N}$ are weight coefficients of the deriving events 111C to 11NC.

$$V_{i1} = R_{i1}'[1-(1-R_{i11}V_{i11})(1-R_{i12}V_{i12})\ldots(1-R_{i1N}V_{i1N})] \quad (2)$$

Then, event evaluation values of other factors indicated by 12C to 1MC (indicating occurrence or non-occurrence of deriving events of the other factors) $V_{ij}$ ($j \geq 2$) are similarly calculated using equation (3) below.

$$V_{ij} = 1 - R_{ij}[1-(1-R_{ij1}V_{ij1})(1-R_{ij2}V_{ij2})\ldots(1-R_{ijN}V_{ijN})] \quad (3)$$

Based on the event evaluation values calculated by means of equations (2) and (3), certainties $CF_i$ of the respective factors are calculated by using equation (1).

$$CF_i = R_i \cdot V_{i1}^{R_{i1}/R} \cdot V_{i2}^{R_{i2}/R} \ldots V_{iM}^{R_{iM}/R} \quad (1)$$

$$(R = R_{i1} + R_{i2} + \ldots + R_{iM})$$

After the certainties of the factors are obtained, the factor having the highest value of certainty $CF_i$ among the calculated certainty values $CF_i$ is adopted as the cause of the current abnormal event.

EXAMPLE 2

Next, in order to describe the invention more in detail, explanation will be made of a case where the invention is applied for finding a cause of an abnormal event in the steam turbine lubricating oil system shown in FIG. 5.

Figure 2:
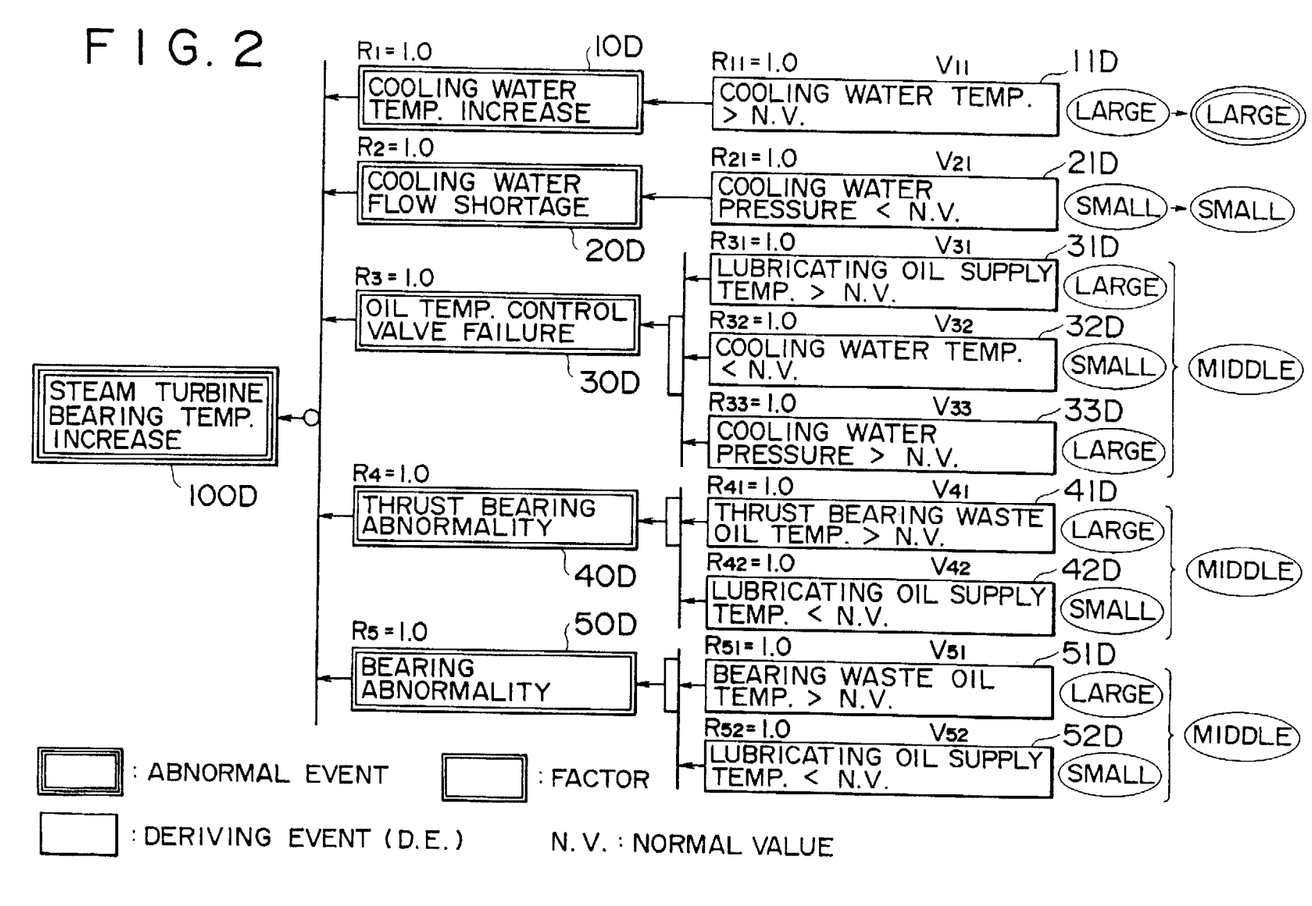
FIG. 2 shows an improved FT chart of a steam turbine bearing temperature increase relating to an example of the invention.

FIG. 2 shows an FT chart relating to the abnormality of "high steam turbine bearing temperature" in which the invention is employed. In the drawing, a change is made to the conventional FT chart in such a way that added thereto are deriving events in the negative form negating deriving events, indicated by 32D, 33D, 42D and 52D, among those of other factors 20D to 50D, which would not possibly occur if a given factor is the cause of the abnormality.

For example, the cooling water temperature increase may be judged to be the cause of the abnormality when the cooling water temperature is found to be higher than the normal value (11 in FIG. 4). In this case, however, it is not possible to determine whether any troubles have occurred somewhere downstream from the point of monitoring the cooling water temperature in the flows of cooling water and oil, or whether additional problems have occurred, because given that the cooling water temperature is higher than the normal value, the abnormal event of having high steam turbine bering temperature occurs regardless of any occurrence or non-occurrence of problems in the down stream of the cooling water and oil flows.

On the other hand, by making judgement concerning the negative form of deriving events somewhere upstream from a given point and finding no abnormalities upstream, it is possible to check possible causes in the down stream. For example, if "cooling water temperature increase" (10D) and "insufficient flow of cooling water" (20D) have not occurred upstream of the cooling water and oil flows, the deriving events recast in the negative form (32D and 33D) and added to the FT chart are found to be true. If then the lubricating oil supply temperature is higher than the normal value (31D), "oil temperature control valve malfunction" (30D) is found to be the cause.

Thus, negative-form deriving events negating deriving events which may occur on the upstream side of a given factor in the system flow are added to the FT chart as deriving events of the given factor. In other words, negative-form deriving events which negates deriving events possibly occurring at a location upstream from a given factor are added to each of factors located in the down stream from that factor, so as to check any occurrences of problems downstream.

Here, when an increase in the cooling water temperature is the cause (or the factor in question), event evaluation values $V_{ij}$ of the deriving events are respectively obtained as shown in the following table:

| Deriving event | Event evaluation value |
| --- | --- |
| $V_{11}$ Cooling water temperature > normal value | Large |
| $V_{21}$ Cooling water pressure < normal value | Small |
| $V_{31}$ Lubricating oil supply temperature > normal value | Large |
| $V_{32}$ Cooling water temperature ≦ normal value | Small |
| $V_{33}$ Cooling water pressure ≧ normal value | Large |
| $V_{41}$ Thrust bearing waste oil temperature > normal value | Large |
| $V_{42}$ Lubricating oil supply temperature ≦ normal value | Small |
| $V_{51}$ Bearing waste oil temperature > normal value | Large |
| $V_{52}$ Lubricating oil supply temperature ≦ normal value | Small |

A high cooling water temperature causes the temperatures of lubricating oil supply, thrust bearing waste oil, and so on to also increase, because these oil temperatures are affected by the temperature of the cooling water. These oil temperatures can be considered to be "downstream" in the system flow. Here, when an event evaluation value is indicated to be "large", it ranges approximately from 0.7 to 1.0, and when "small", it approximately ranges from 0.0 to 0.3.

Certainties of the factors respectively calculated using equation (1) are as follows:

| Factor | Certainty |
| --- | --- |
| $CF_1$ Cooling water temperature increase | Large |
| $CF_2$ Cooling water flow shortage | Small |
| $CF_3$ Oil temperature control valve failure | Middle |
| $CF_4$ Thrust bearing abnormality | Middle |
| $CF_5$ Bearing abnormality | Middle |

Here, when a certainty is indicated to be "large", its value approximately ranges from 0.7 to 1.0, when "middle", it approximately ranges from 0.3 to 0.7, and when "small", it approximately ranges from 0.0 to 0.3.

Thus, the certainty or credibility of the cause, that of the cooling water temperature increase in this case, is highest, making it possible for the plant operation supporting device to identify the true cause.

It is clear from the foregoing description that according to the invention, by narrowing down the cited factors, the true cause can be found from factors cited when an abnormal event occurs, and an instruction can be given to an operator as to what countermeasure is appropriate to solve the abnormality, making it possible even for an unskilled operator to take a proper countermeasure when an abnormal event occurs in much the same way as a highly skilled operator would do.

Lastly, it should be understood that the examples given above are for illustrative purposes only and by no means intended to limit the scope of the present invention. For example, choice of specific values of $R_i$ and $R_{ij}$ and that of deriving events to be considered have to be made for each system. They are in no way limited to the values or choices shown in the examples. Other modifications are clearly possible for a person of ordinary skill in the art without departing the scope of the present invention.

What is claimed is:

1. A method performed in a plant operation supporting device having a computer for finding a cause of an abnormal event in support of a plant operation comprising the steps of:

using the plant operation supporting device, detecting an abnormal event in the plant operation;

using a relationship between the abnormal event and a plurality of factors causing the abnormal event, a fault tree chart showing relationships among the factors and deriving events thereof, and an event evaluation value indicating a possibility of occurrence of the deriving events;

with respect to a first deriving event which is associated with a first factor among said plurality of factors and which would not occur if a second factor among said plurality of factors which is different from the first factor is the cause of the abnormal event, providing a second deriving event which is obtained by taking the negative form of said first deriving event; and adding said second deriving event to said fault tree chart;

wherein when an event evaluation value for each deriving event is $V_{ij}$, a certainty $CF_i$ of each factor is calculated using the following equation $CF_i = R_i \cdot V_{i1}^{Ri1/R} \cdot V_{i2}^{Ri2/R} \ldots V_{iM}^{RiM/R}$ wherein $R = R_{i1} + R_{i2} + \ldots + R_{iM}$ and $R_{in}$ is a set value indicating the strength of a relationship between each deriving event and each factor; and wherein a factor having a largest value among values of certainties $CF_i$ is identified as the cause of the abnormal event.

2. A method according to claim 1, wherein said adding step comprises the step of:

adding said second deriving event to said fault tree chart as a deriving event of said second factor.

3. A method according to claim 2, wherein event evaluation values are assigned corresponding to the occurrence and non-occurrence of the respective deriving events and said identified factors.

4. A method according to claim 3, further comprising a determining step which calculates a certainty value for each identified factor, and wherein existence of deriving events which would not occur if an identified factor is the cause of the abnormality reduces the certainty value for that factor.

5. A method according to claim 4, wherein the factor having the highest certainty value is identified as the cause of the abnormal event.

6. A method performed in a slant operation supporting device having a computer for determining a cause of an abnormal event in a plant operation, comprising the steps of:

monitoring predetermined parameters for abnormal events in the plant operation;

detecting an abnormal event in the plant operation;

identifying a plurality of factors possibly causally related to said abnormal event in the plant operation defined by a fault tree;

comparing said possible factors with occurrence and non-occurrence of a plurality of deriving events;

assigning event evaluation values corresponding to the occurrence and non-occurrence of the respective deriving events and said identified factors;

negating deriving events for identified factors associated with non-occurrence of said deriving events by adding deriving events in negative form to said fault tree; and determining a probability of fault of each of said factors corresponding to the occurrence and non-occurrence of said deriving events;

wherein when an event evaluation value for each deriving event is $V_{ij}$, a certainty $CF_i$ of each factor is calculated using the following equation $CF_i = R_i \cdot V_{i1}^{Ri1/R} \cdot V_{i2}^{Ri2/R} \ldots V_{iM}^{RiM/R}$ wherein $R = R_{i1} + R_{i2} + \ldots + R_{iM}$ and $R_{in}$ is a set value indicating the strength of a relationship between each deriving event and each factor; and wherein a factor having a largest value among values of certainties $CF_i$ is identified as the cause of the abnormal event.

7. A method according to claim 6, wherein said fault tree chart defines relationships among the factors and respective deriving events thereof.

8. A method according to claim 7, wherein said determining step calculates a certainty value for each identified factor, and wherein existence of deriving events which would not occur if an identified factor is the cause of the abnormality reduces the certainty value for that factor.

* * * * *

UNITED STATES PATENT AND TRADEMARK OFFICE
CERTIFICATE OF CORRECTION

PATENT NO. : 5,799,294
DATED : August 25, 1998
INVENTOR(S) : Tanaka

It is certified that error appears in the above-identified patent and that said Letters Patent is hereby corrected as shown below:

Column 7, line 13, "slant" should be --plant--.

Signed and Sealed this

First Day of December, 1998

*Attest:*

BRUCE LEHMAN

*Attesting Officer*       *Commissioner of Patents and Trademarks*